United States Patent
Abe et al.

(10) Patent No.: US 11,479,700 B2
(45) Date of Patent: Oct. 25, 2022

(54) URETHANE ADHESIVE COMPOSITION

(71) Applicant: Sika Hamatite Co., LTD., Hiratsuka (JP)

(72) Inventors: Megumi Abe, Kanagawa (JP); Yuichi Matsuki, Kanagawa (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 0 days.

(21) Appl. No.: 17/310,199

(22) PCT Filed: Jan. 30, 2019

(86) PCT No.: PCT/JP2019/003128
§ 371 (c)(1),
(2) Date: Jul. 26, 2021

(87) PCT Pub. No.: WO2020/157854
PCT Pub. Date: Aug. 6, 2020

(65) Prior Publication Data
US 2022/0002599 A1    Jan. 6, 2022

(51) Int. Cl.
| | | |
|---|---|---|
| C09J 175/04 | (2006.01) |
| C08G 18/12 | (2006.01) |
| C08G 18/28 | (2006.01) |
| C08G 18/69 | (2006.01) |
| C08G 18/71 | (2006.01) |
| C08G 18/73 | (2006.01) |
| C08G 18/78 | (2006.01) |
| C08G 18/79 | (2006.01) |

(52) U.S. Cl.
CPC .......... C09J 175/04 (2013.01); C08G 18/12 (2013.01); C08G 18/289 (2013.01); C08G 18/2865 (2013.01); C08G 18/69 (2013.01); C08G 18/718 (2013.01); C08G 18/73 (2013.01); C08G 18/7831 (2013.01); C08G 18/792 (2013.01); C09J 2301/30 (2020.08); C09J 2423/006 (2013.01)

(58) Field of Classification Search
CPC ....... C09J 175/04; C08K 5/544; C08G 18/792
See application file for complete search history.

(56) References Cited

U.S. PATENT DOCUMENTS

| | | | |
|---|---|---|---|
| 2003/0092868 A1* | 5/2003 | Morikawa .......... | C08G 18/4615 528/69 |
| 2017/0158927 A1 | 6/2017 | Araki | |
| 2018/0208814 A1 | 7/2018 | Araki | |
| 2018/0208815 A1 | 7/2018 | Araki | |
| 2018/0223144 A1* | 8/2018 | Abe .................. | C09J 11/06 |
| 2019/0136105 A1* | 5/2019 | Abe .................. | C09J 175/04 |

FOREIGN PATENT DOCUMENTS

| | | |
|---|---|---|
| JP | 2008-542501 A | 11/2008 |
| JP | 2017-218539 A | 12/2017 |
| WO | 2017/014188 A1 | 1/2017 |
| WO | 2017/022666 A1 | 2/2017 |
| WO | WO 2017/189057 A1 | 11/2017 |
| WO | 2018/025702 A1 | 2/2018 |
| WO | WO 2016/199751 A1 | 4/2018 |
| WO | WO 2018/132242 A1 | 7/2018 |
| WO | 2019/054333 A1 | 3/2019 |
| WO | WO 2019/068083 A1 | 4/2019 |
| WO | WO 2018/061335 A1 | 7/2019 |
| WO | WO 2019/156737 A1 | 8/2019 |
| WO | WO 2018/100674 A1 | 10/2019 |
| WO | WO 2020/009792 A1 | 1/2020 |

OTHER PUBLICATIONS

GoogleTranslation of WO 2017014188 A! (Year: 2022).*

* cited by examiner

*Primary Examiner* — Michael M Dollinger
(74) *Attorney, Agent, or Firm* — Thorpe North & Western

(57) ABSTRACT

An object of the present invention is to provide a urethane adhesive composition excellent in adhesion durability for an olefin resin. The present invention is a urethane adhesive composition containing a urethane prepolymer having an isocyanate group, an isocyanurate compound of pentamethylene diisocyanate and/or hexamethylene diisocyanate, and a secondary aminosilane compound.

12 Claims, No Drawings

URETHANE ADHESIVE COMPOSITION

TECHNICAL FIELD

The present invention relates to a urethane adhesive composition.

BACKGROUND ART

In recent years, from the viewpoint of reducing the weight of automobiles, a material of a vehicle body (body) has been changed from a steel plate to a resin material (for example, a resin material containing at least an olefinic resin).

On the other hand, as an adhesive composition that can be applied to an 15 adherend formed from a material such as an olefin resin, there has been proposed, for example, a two-part curable urethane adhesive composition including a main agent containing a urethane prepolymer (A), an isocyanurate group-containing polyisocyanate (B), and isocyanate silane (C), and a curing agent containing a compound (D) having two or more active hydrogen groups 20 per molecule and an aromatic compound (E) represented by a specific formula (Patent Document 1)

As an adhesive composition that can be applied to a base material or the like containing an olefin resin, for example, a urethane adhesive composition 25 containing a urethane prepolymer having an isocyanate group, an isocyanurate compound having an isocyanurate ring, and a terpene compound having an active hydrogen has been proposed (Patent Document 2).

CITATION LIST

Patent Literature

Patent Document 1: JP 2017-218539 A
Patent Document 2: WO 2017/022666

SUMMARY OF INVENTION

Technical Problem

From the viewpoint of safety of an automobile and the like, there is an increasing demand for adhesiveness to resins.

Under such circumstances, the present inventors prepared and evaluated a urethane adhesive composition containing a silane coupling agent with reference to Patent Documents 1 and 2, and found that when such a composition is applied to a base material not subjected to primer treatment and containing at least an olefin resin, durability of the adhesiveness of the adhesive composition may not always comply with the level required nowadays.

Then, an object of the present invention is to provide a urethane adhesive composition excellent in adhesion durability for an olefin resin.

Solution to Problem

As a result of diligent research to solve the problems described above, the present inventors found that a desired effect could be achieved by using a specific aminosilane compound for a urethane adhesive composition, and thus completed the present invention.

An embodiment of the present invention is based on the findings described above, and specifically solves the problems described above by the following configurations.

[1] A urethane adhesive composition containing
a urethane prepolymer having an isocyanate group,
an isocyanurate compound of pentamethylene diisocyanate and/or hexamethylene diisocyanate, and
a secondary aminosilane compound.

[2] The urethane adhesive composition according to [1], wherein the secondary aminosilane compound is a bis-type compound.

[3] The urethane adhesive composition according to [1] or [2], wherein the secondary aminosilane compound is a compound represented by Formula (A) below.

[Chemical Formula 1]

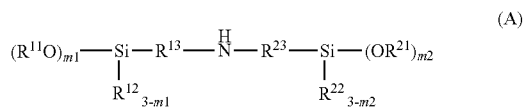

In Formula (A), $R^{13}$ and $R^{23}$ each independently represent a divalent linking group, $R^{11}$, $R^{12}$, $R^{21}$, and $R^{22}$ each independently represent a monovalent hydrocarbon group, and m1 and m2 are each independently from 1 to 3.

[4] The urethane adhesive composition according to [3], wherein $R^{11}$ and $R^{21}$ each independently represent an aliphatic hydrocarbon group in Formula (A) above.

[5] The urethane adhesive composition according to [3] or [4], wherein $R^{13}$ and $R^{23}$ each independently represent a divalent hydrocarbon group having from 2 to 10 carbon atoms in Formula (A) above.

[6] The urethane adhesive composition according to any one of [1] to [5], further containing a terpene compound.

[7] The urethane adhesive composition according to [6], wherein the terpene compound includes at least an adduct of a compound represented by Formula (X) below and a phenol compound.

[Chemical Formula 2]

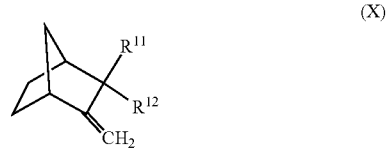

In Formula (X), $R^{11}$ and $R^{12}$ each independently represent a hydrocarbon group.

[8] The urethane adhesive composition according to any one of [1] to [7], further containing an isocyanate silane compound.

[9] The urethane adhesive composition according to [8], wherein the isocyanate silane compound is a compound represented by Formula (I) below.

[Chemical Formula 3]

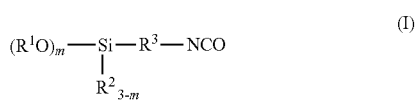

In Formula (I), $R^1$ and $R^2$ each independently represent a monovalent hydrocarbon group, $R^3$ represents a divalent linking group, and m is from 1 to 3.

[10] The urethane adhesive composition according to [9], wherein in Formula [1] above, $R^3$ represents a divalent hydrocarbon group having from 1 to 6 carbon atoms, and m is 2 to 3.

[11] The urethane adhesive composition according to any one of [1] to [10], wherein a content of the secondary aminosilane compound is less than 0.5% by mass relative to a total amount of the urethane adhesive composition.

[12] The urethane adhesive composition according to any one of [1] to [11], wherein the isocyanurate compound is an isocyanurate compound of pentamethylene diisocyanate.

[13] The urethane adhesive composition according to any one of [1] to [12], used for adhering a base material containing an olefin resin.

Advantageous Effects of Invention

The urethane adhesive composition of the present invention is excellent in adhesion durability for an olefin resin.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Additionally, in the present specification, the value range indicated by using "from . . . to . . . " means the range including the former value as a lower limit value and the latter value as an upper limit value.

In the present specification, unless otherwise indicated, a substance corresponding to each component can be used alone or in combination of two or more types thereof. In a case where a component includes two or more types of substances, content of component means the total content of the two or more types of substances.

In the present invention, the production method of each component is not particularly limited unless otherwise noted. Examples of the method include a known method.

In the present specification, being more excellent in adhesion durability for an olefin resin may be referred to as "being more excellent in the effect of the present invention". In addition, "adhesion durability for an olefin resin" may simply be referred to as "adhesion durability".

Urethane Adhesive Composition

The urethane adhesive composition according to an embodiment of the present invention (adhesive composition according to an embodiment of the present invention) is a urethane adhesive composition containing a urethane prepolymer having an isocyanate group, an isocyanurate compound of pentamethylene diisocyanate and/or hexamethylene diisocyanate, and a secondary aminosilane compound.

In the present specification, the isocyanurate compound may be referred to as a "specific isocyanurate compound", and the secondary aminosilane compound may be referred to as a "specific aminosilane compound".

It is thought that the adhesive composition according to an embodiment of the present invention can achieve an effect of excellent adhesion durability (for example, adhesiveness durability against water or heat) because of having such a configuration.

The reason for this is that the specific aminosilane compound, because of having a secondary amino group, can react with a portion of the urethane prepolymer and the specific isocyanurate compound, whereby the urethane prepolymer and the specific isocyanurate compound can be cured by two curing systems: reaction with isocyanate group and reaction with hydrolyzable silyl group.

It is thought that the specific aminosilane compound has a secondary amino group and thus has a lower polarity than the aminosilane compound having a primary amino group, and therefore, the adhesive composition according to an embodiment of the present invention containing the specific aminosilane compound is easily wetted with a base material containing at least an olefin resin having low polarity.

For the reasons described above, the present inventors presume that when the adhesive composition according to an embodiment of the present invention is applied to a base material containing at least an olefin resin, durability of adhesiveness to the base material is excellent even when the base material is not primed.

The mechanism associated with the present invention is not limited to the above mechanism. Within the scope of the present invention, the mechanism may be other than that described above.

Each component contained in the adhesive composition according to an embodiment of the present invention will be described in detail below.

Urethane Adhesive Composition

Urethane Prepolymer

The urethane prepolymer contained in the adhesive composition according to an embodiment of the present invention is a compound having an isocyanate group.

An example of a preferable aspect is one in which the urethane prepolymer has a plurality of isocyanate groups (preferably, two isocyanate groups).

The urethane prepolymer preferably has an isocyanate group at a molecular terminal.

As the urethane prepolymer, a known urethane prepolymer can be used. For example, a reaction product obtained by allowing a polyisocyanate compound to react with a compound having two or more active hydrogen-containing groups per molecule (hereinafter, abbreviated as an "active hydrogen compound") in a manner that an amount of the isocyanate group becomes excess with respect to an amount of the active hydrogen-containing groups, or the like can be used.

In the present invention, "active hydrogen-containing group" indicates "group containing an active hydrogen". Examples of the active hydrogen-containing group include a hydroxy group, an amino group, and an imino group.

Polyisocyanate Compound

The polyisocyanate compound used in the production of the urethane prepolymer is not particularly limited as long as the polyisocyanate compound has two or more isocyanate groups in a molecule.

Examples of the polyisocyanate compound include aromatic polyisocyanates, such as tolylene diisocyanate (TDI), diphenylmethane diisocyanate (MDI), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic (the aliphatic group is a concept including linear, branched, and alicyclic aliphatic groups) polyisocyanates, such as hexamethylene diisocyanate (HDI), trimethylhexamethylene diisocyanate (TMHDI), lysine diisocyanate, norbornane diisocyanate (NBDI), transcyclohexane-1, 4-diisocyanate, isophorone diisocyanate (IPDI), bis (isocyanate methyl)cyclohexane ($H_6XDI$), and dicyclohexylmethane diisocyanate ($H_{12}MDI$); and carbodiimide-modified polyisocyanates thereof.

The polyisocyanate compound may be used alone or a combination of two or more types of the polyisocyanate compounds may be used.

Among these, an aromatic polyisocyanate is preferable, and MDI is more preferable, from the perspective of excellent curability.

Active Hydrogen Compound

The compound having two or more active hydrogen-containing groups per molecule (active hydrogen compound) that is used in the production of the urethane prepolymer is not particularly limited. Examples of the active hydrogen-containing group include a hydroxy (OH) group, an amino group, and an imino group.

Suitable examples of the active hydrogen compound include a polyol compound having two or more hydroxy (OH) groups per molecule, and a polyamine compound having two or more amino groups and/or imino groups per molecule. Among these, a polyol compound is preferable.

The polyol compound is not particularly limited as long as the polyol compound is a compound having two or more OH groups. Specific examples of the polyol compound include polyether polyol; polyester polyol; acrylic polyol; polybutadiene polyol, and hydrogenated polybutadiene polyol; low-molecular-weight polyhydric alcohols; and mixed polyols of these. Among these, an example of a preferable aspect is one in which the polyol compound is a polyether polyol.

The polyether polyol is not particularly limited as long as the polyether polyol is a compound having a polyether as a main chain and having two or more hydroxy groups. The term "polyether" is a group having two or more ether bonds, and specific examples thereof include a group having a total of two or more of structural units: —$R^a$—O—$R^b$—. Here, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, polyol of ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with the polyisocyanate compound.

A weight average molecular weight of the polyether polyol is preferably from 500 to 20000, from the perspective of the viscosity of the urethane prepolymer, obtained by a reaction with an isocyanate compound, exhibiting a suitable fluidity at ambient temperature. In the present invention, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer is preferably a urethane prepolymer formed by reacting a polyether polyol and an aromatic polyisocyanate compound, from the perspective of achieving better effects of the present invention and excellent curability.

The urethane prepolymer can be used alone or in combination of two or more kinds.

A method of producing the urethane prepolymer is not particularly limited. For example, the urethane prepolymer can be produced by using a polyisocyanate compound to allow from 1.5 to 2.5 mol of an isocyanate group to react with respect to 1 mol of an active hydrogen-containing group (for example, a hydroxy group) in an active hydrogen compound, and mixing these to allow them to react.

The urethane prepolymer can be used alone or in combination of two or more kinds.

Isocyanurate Compound

The adhesive composition according to an embodiment of the present invention contains an isocyanurate compound (specific isocyanurate compound) of pentamethylene diisocyanate and/or hexamethylene diisocyanate. The specific isocyanurate compound has an isocyanurate ring.

The isocyanurate ring is represented by Formula (B1) below:

[Chemical Formula 4]

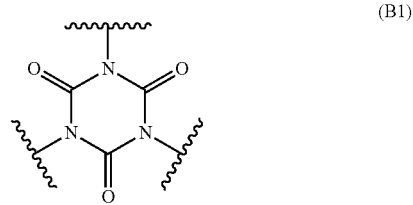

(B1)

The diisocyanate compound constituting the specific isocyanurate compound may be pentamethylene diisocyanate (PDI) alone, hexamethylene diisocyanate (HDI) alone, and a combination of pentamethylene diisocyanate and hexamethylene diisocyanate.

Examples of the specific isocyanurate compound include a compound represented by Formula (C1-1) below, which is an isocyanurate form of hexamethylene diisocyanate, and a compound represented by Formula (C1-2) below, which is an isocyanurate form of pentamethylene diisocyanate.

[Chemical Formula 5]

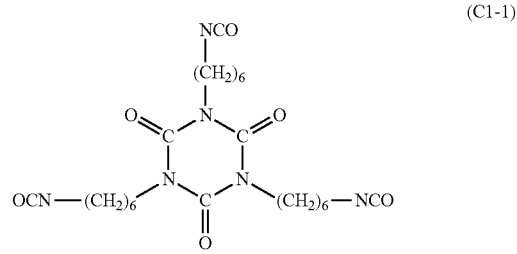

(C1-1)

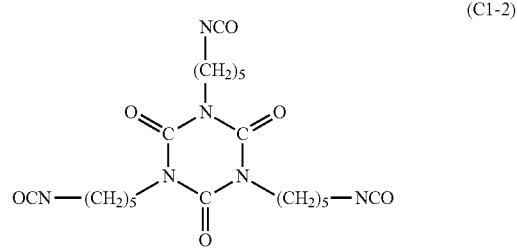

(C1-2)

The specific isocyanurate compound is preferably a compound represented by Formula (C1-2) above because the specific isocyanurate compound has more excellent adhesion durability, excellent initial adhesiveness, and low viscosity, and therefore is easily added to the composition.

Content of Specific Isocyanurate Compound

A content of the specific isocyanurate compound is preferably from 0.1 to 10% by mass, and more preferably from 0.5 to 5% by mass, relative to a total amount of the adhesive composition according to an embodiment of the present invention, from the perspective of achieving more excellent adhesion durability and excellent initial adhesiveness.

Secondary Aminosilane Compound

The secondary aminosilane compound (specific aminosilane compound) contained in the adhesive composition according to an embodiment of the present invention is a compound having —NH— as a secondary amino group and a hydrolyzable silyl group.

The specific aminosilane compound may react with each of the urethane prepolymer and the specific isocyanurate compound.

Furthermore, the specific aminosilane compound may react with an isocyanate silane compound described below.

Secondary Amino Group

An example of a preferable aspect is one in which a nitrogen atom constituting —NH— as a secondary amino group is bonded to two different carbon atoms.

The specific aminosilane compound preferably has one secondary amino group per molecule.

Hydrolyzable Silyl Group

Examples of the hydrolyzable silyl group in the secondary aminosilane compound include groups represented by —Si(OR$^{10}$)$_m$R$^{20}$$_{3-m}$. m is from 1 to 3.

In —Si(OR$^{10}$)$_m$R$_{3-m}$, R$^{10}$ and R$^{20}$ are each independently a monovalent hydrocarbon group.

Examples of the monovalent hydrocarbon group include aliphatic hydrocarbon groups (which may be linear, branched, alicyclic, or combinations of these; hereinafter the same), aromatic hydrocarbon groups, and combinations of these. Among these, an example of a preferable aspect is an aliphatic hydrocarbon group.

Examples of the aliphatic hydrocarbon group include a methyl group and an ethyl group.

A portion of the hydrolyzable silyl group may be hydrolyzed to form a silanol group.

Linking Group

The secondary amino group and the hydrolyzable silyl group can be bonded through a linking group. An example of a preferable aspect is one in which the linking group is divalent.

Examples of the linking group include a hydrocarbon group. Examples of the hydrocarbon group include aliphatic hydrocarbon groups (which may be linear, branched, alicyclic, or combinations of these; hereinafter the same), aromatic hydrocarbon groups, and combinations of these.

Among those, from the perspective of achieving more excellent adhesion durability and excellent initial adhesiveness, the linking group is preferably an aliphatic hydrocarbon group, and more preferably a linear or branched aliphatic hydrocarbon group.

Among these, from the perspective of achieving more excellent adhesion durability and excellent initial adhesiveness, the linking group is preferably a trimethylene group or propylene group, and more preferably a trimethylene group.

From the perspective of achieving more excellent adhesion durability and excellent initial adhesiveness, the number of carbon atoms of the linking group (particularly aliphatic hydrocarbon group) is preferably from 2 to 10, and more preferably from 2 to 5.

The linking group is preferably formed only from carbon and hydrogen.

Bis Type

From the perspective of achieving more excellent adhesion durability and excellent initial adhesiveness, the specific aminosilane compound is preferably a bis-type compound.

In the present invention, the fact that the specific aminosilane compound is a bis-type compound means that the number of the hydrolyzable silyl groups in the specific aminosilane compound is two per molecule.

Formula (A)

From the perspective of achieving more excellent adhesion durability and excellent initial adhesiveness, the specific aminosilane compound is preferably a compound represented by Formula (A) below:

[Chemical Formula 6]

$$(R^{11}O)_{m1}\text{—Si—}R^{13}\text{—}\overset{H}{N}\text{—}R^{23}\text{—Si—}(OR^{21})_{m2} \quad (A)$$
$$\overset{|}{R^{12}{}_{3-m1}} \qquad \overset{|}{R^{22}{}_{3-m2}}$$

R$^{13}$, R$^{23}$

In Formula (A), R$^{13}$ and R$^{23}$ each independently represent a divalent linking group. The linking group as R$^{13}$ or R$^{23}$ is similar to the linking group between the secondary amino group and the hydrolyzable silyl group.

It is preferable that R$^{13}$ and R$^{23}$ each independently represent a divalent hydrocarbon group having from 2 to 10 carbon atoms, a trimethylene group and a propylene group are preferable, and a trimethylene group is more preferable.

R$^{11}$, R$^{12}$, R$^{21}$, R$^{22}$

R$^{11}$, R$^{12}$, R$^{21}$, and R$^{22}$ each independently represent a monovalent hydrocarbon group. The monovalent hydrocarbon group as R$^{11}$, R$^{12}$, R$^{21}$, and R$^{22}$ is similar to the monovalent hydrocarbon group as R$^{10}$ or R$^{20}$ described above.

It is preferable that R$^{11}$ and R$^{21}$ each independently represent a monovalent aliphatic hydrocarbon group, and a methyl group and an ethyl group are more preferable.

m1, m2 m1 and m2 are each independently from 1 to 3. m1 and m2 are preferably each independently from 2 to 3, and m1 and m2 are more preferably 3.

Specific examples of the specific aminosilane compound include N, N-bis[(3-trimethoxysilyl)propyl]amine, N, N-bis[(3-triethoxysilyl)propyl]amine, N, N-bis[(3-tripropoxysilyl)propyl]amine, and 3-(n-butylamino)propyltrimethoxysilane.

From the perspective of achieving more excellent adhesion durability and excellent initial adhesiveness, the specific aminosilane compound is preferably N, N-bis[(3-trimethoxysilyl)propyl]amine.

Content of Specific Aminosilane Compound

A content of the specific aminosilane compound is preferably less than 0.5% by mass, and more preferably from 0.01 to 0.4% by mass, relative to the total amount of the adhesive composition according to an embodiment of the present invention, from the perspective of achieving more excellent adhesion durability and excellent initial adhesiveness.

A molar ratio (NH/NCO molar ratio) of the secondary amino group to the total amount of an isocyanate group in the adhesive composition according to an embodiment of the present invention is preferably from 0.0005 to 0.05, from the perspective of achieving more excellent adhesion durability and excellent initial adhesiveness.

A molar ratio (specific aminosilane compound/specific isocyanurate compound) of the specific aminosilane compound to the specific isocyanurate compound is more preferably from 0.0005 to 3, from the perspective of achieving more excellent adhesion durability and excellent initial adhesiveness.

Terpene Compound

The adhesive composition according to an embodiment of the present invention preferably further contains a terpene compound, from the perspective of achieving more excellent adhesion durability and excellent initial adhesiveness.

In the present invention, the terpene compound can function as an adhesion promoter.

In the present invention, the terpene compound refers to terpenes or derivatives thereof.

Although the terpenes generally means a structure of an isoprene unit ($C_5H_8$) alone or a structure in which a plurality of isoprene units ($C_5H_8$) are connected (linked), elements constituting the terpenes are not limited to carbon and hydrogen, and may include oxygen in addition to carbon and hydrogen. In the case where the terpenes have oxygen, the oxygen can constitute, for example, a carbonyl group and a hydroxy group in the terpenes. The terpenes having the carbonyl group and the like are generally also referred to as terpenoids.

In the present invention, the derivatives of the terpenes can include, for example, phenolic derivatives of the terpenes, in addition to the terpenoids.

Furthermore, in the present invention, the terpene compound may further have an active hydrogen and an ether bond, for example.

Active Hydrogen

When the terpene compound further has an active hydrogen, the terpene compound having an active hydrogen can have, for example, a hydroxy group as the active hydrogen (group having an active hydrogen).

Examples of the hydroxy group include a phenolic hydroxy group (hydroxy group bonded to a benzene ring), and an alcoholic hydroxy group (hydroxy group bonded to an aliphatic hydrocarbon having linear aliphatic hydrocarbon, branched aliphatic hydrocarbon, alicyclic aliphatic hydrocarbon, or combinations of these).

An example of a preferable aspect of the terpene compound having an active hydrogen is a terpene compound having a phenolic hydroxy group.

Ether Bond

When the terpene compound further has an ether bond, examples of the terpene compound having an ether bond include a terpene compound having an alkoxy group and a terpene compound having a phenoxy group.

An example of a preferable aspect of the terpene compound having an ether bond is a terpene compound having a phenoxy group.

An oxygen atom constituting the alkoxy group can be bonded to two carbon atoms to form an ether bond. The same applies to the oxygen atom constituting the phenoxy group.

Terpenes

Terpenes can generally be classified by the number of isoprene units (the number of carbon atoms). When terpenes are classified by the number of isoprene units, examples of the terpenes include hemiterpene which is a compound having 5 carbon atoms; monoterpene which is a compound having 10 carbon atoms; sesquiterpene which is a compound having 15 carbon atoms; diterpen which is a compound having 20 carbon atoms; sesterterpene which is a compound having 25 carbon atoms; triterpene which is a compound having 30 carbon atoms; and tetraterpene which is a compound having 40 carbon atoms.

The terpenes may be hydrogenated. The hydrogenation may be either partial hydrogenation or full hydrogenation.

From the perspective of achieving more excellent adhesion durability and excellent initial adhesiveness, the terpenes as the terpene compound are preferably monoterpenes or derivatives thereof (for example, terpenoids, phenol derivatives of monoterpenes).

Monoterpene or Derivatives Thereof

Examples of the monoterpene or derivatives thereof include linear monoterpene and derivatives thereof such as myrcene, linalool, and nerol;

monocyclic monoterpene and derivatives thereof such as terpineol (terpineol is one type of monocyclic monoterpene having a hydroxy group) such as a compound represented by Formula (3) below (limonene), 1-p-mentene, carvone, a compound represented by Formula (5) below (α-terpineol), a compound represented by Formula (6) below (β-terpineol), and a compound represented by Formula (7) below (γ-terpineol); and dicyclic monoterpene and derivatives thereof such as a compound represented by Formula (1) below (α-pinene), a compound represented by Formula (2) below (β-pinene), camphor, and a compound represented by Formula (X) below.

Examples of the derivatives of the dicyclic monoterpene include a phenol derivative of a monoterpene such as an adduct of a compound represented by Formula (X) below and a phenol compound.

[Chemical Formula 7]

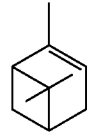

(1)

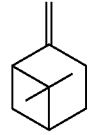

(2)

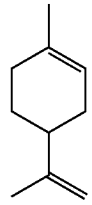

(3)

[Chemical Formula 8]

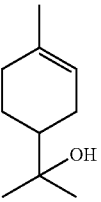

(5)

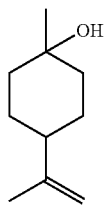

(6)

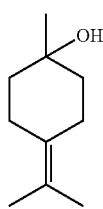

(7)

[Chemical Formula 9]

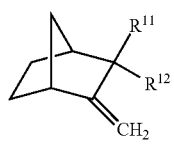

(X)

In Formula (X), $R^{11}$ and $R^{12}$ each independently represent a hydrocarbon group.

From the perspective of achieving more excellent adhesion durability and excellent initial adhesiveness, the terpene compound is preferably a terpene compound having an active hydrogen or an ether bond, more preferably a derivative of monoterpene having an active hydrogen or an ether bond, even more preferably a phenolic derivative of monoterpene, and particularly preferably an adduct of the compound represented by Formula (X) below and a phenol compound.

In the present specification, the adduct of the compound represented by Formula (X) and a phenol compound may be referred to simply as an "adduct" hereinafter.

Adduct

The adduct is a reaction product obtained by addition reaction of the compound represented by Formula (X) and a phenol compound.

Compound Represented by Formula (X)

In Formula (X) above, the hydrocarbon group as $R^{11}$ and $R^{12}$ is not particularly limited. The hydrocarbon group may have a heteroatom. An example of a preferable aspect is one in which the hydrocarbon group includes only a carbon atom and a hydrogen atom.

The hydrocarbon group is not particularly limited, and specific examples thereof include aliphatic hydrocarbon groups, aromatic hydrocarbon groups, and combinations thereof. Among these, aliphatic hydrocarbon groups are preferred.

The aliphatic hydrocarbon group may be any of linear, branched, cyclic or a combination thereof. Specific examples of the aliphatic hydrocarbon group include linear or branched aliphatic hydrocarbon groups. From the perspective of being more excellent in the effect of the present invention, the aliphatic hydrocarbon group is preferably a linear aliphatic hydrocarbon group.

The number of carbon atoms of the aliphatic hydrocarbon group is preferably from 1 to 20, and more preferably from 1 to 10, from the perspective of being more excellent in the effect of the present invention.

From the perspective of being more excellent in the effect of the present invention, the aliphatic hydrocarbon group is preferably a methyl group, an ethyl group, a propyl group, a butyl group, a pentyl group, a hexyl group, a heptyl group, an octyl group, a nonyl group, and a decyl group, and more preferably a methyl group.

Examples of the aromatic hydrocarbon group include aryl groups, and naphthyl groups. Examples of the aryl group include aryl groups having from 6 to 18 carbon atoms, such as a phenyl group, tolyl group, and xylyl group.

The hetero atom that may be included in the hydrocarbon group is not particularly limited, and specific examples thereof include an oxygen atom, a nitrogen atom, a sulfur atom, and a halogen atom (a fluorine atom, a chlorine atom, a bromine atom, and the like). The hetero atom may be bonded to another hetero atom, carbon atom, or hydrogen atom to form a functional group.

From the perspective of achieving more excellent adhesion durability, the compound represented by Formula (X) above is preferably camphene. Camphene is a compound represented by Formula (X1) below:

[Chemical Formula 10]

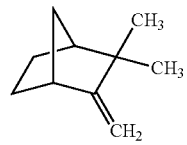

(X1)

Phenol Compound

The phenol compound which is another compound that can form the adduct is not particularly limited as long as the phenol compound is a compound in which a hydroxy group is bonded to a benzene ring.

The phenol compound can have one or more phenolic hydroxy groups (hydroxy groups directly bonded to a benzene ring) per molecule and preferably has one phenolic hydroxy group.

Examples of the phenol compound include a compound represented by Formula (Y) below.

[Chemical Formula 11]

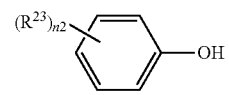

(Y)

In Formula (Y), $R^{23}$ represents a substituent, and n2 represents 0 or from 1 to 4.

Examples of the substituent as $R^{23}$ in Formula (Y) include hydrocarbon groups and hydroxy groups.

n2 represents 0 or from 1 to 4, and from the perspective of achieving more excellent adhesion durability, n2 is preferably 0.

The phenol compound is, for example, preferably phenol from the perspective of achieving more excellent adhesion durability and excellent initial adhesiveness.

From the perspective of achieving more excellent adhesion durability, excellent initial adhesiveness, and low odor, the terpene compound preferably contains at least an adduct of the compound represented by Formula (X) above and a phenol compound, and a reaction product of one molecule of the compound represented by Formula (X) above and one molecule of the phenol compound is more preferable.

From the perspective of being more excellent in the effect of the present invention and achieving excellent initial adhesiveness, the adduct preferably has a phenolic hydroxy group or phenoxy group (both of which may further have the substituent on a benzene ring) from the phenol compound.

The adduct may include at least the reaction product. In addition to the reaction product, the adduct may further include a reaction by-product or unreacted product.

Examples of the adduct include a compound represented by any of Formulas (Z1) to (Z3) below.

[Chemical Formula 12]

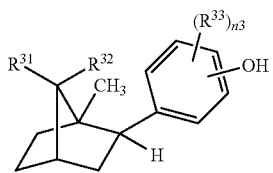

(Z1)

In Formula (Z1), $R^{31}$ and $R^{32}$ each independently represent a hydrocarbon group, $R^{33}$ represents a substituent, and n3 represents 0 or from 1 to 4.

In Formula (Z1), the hydrocarbon group as $R^{31}$ or $R^{32}$ is similar to the hydrocarbon group as $R^{11}$ or $R^{12}$ in Formula (X).

The substituent as $R^{33}$ is similar to the substituent as $R^{23}$ in Formula (Y).

n3 represents 0 or from 1 to 4, and 0 is preferable.

[Chemical Formula 13]

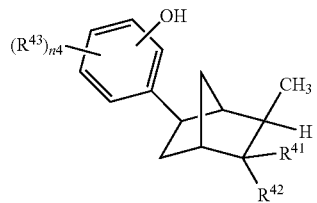

(Z2)

In Formula (Z2), $R^{41}$ and $R^{42}$ each independently represent a hydrocarbon group, $R^{43}$ represents a substituent, and n4 represents 0 or from 1 to 4.

In Formula (Z2), the hydrocarbon group as $R^{41}$ or $R^{42}$ is similar to the hydrocarbon group as $R^{11}$ or $R^{12}$ in Formula (X).

The substituent as $R^{43}$ is similar to the substituent as $R^{23}$ in Formula (Y).

n4 represents 0 or from 1 to 4, and 0 is preferable.

[Chemical Formula 14]

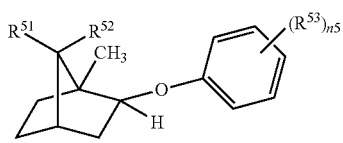

(Z3)

In Formula (Z3), $R^{51}$ and $R^{52}$ each independently represent a hydrocarbon group, $R^{53}$ represents a substituent, and n5 represents 0 or from 1 to 4.

In Formula (Z3), the hydrocarbon group as $R^{51}$ or $R^{52}$ is similar to the hydrocarbon group as $R^{11}$ or $R^{12}$ in Formula (X).

The substituent as $R^{53}$ is similar to the substituent as $R^{23}$ in Formula (Y).

n5 represents 0 or from 1 to 4, and 0 is preferable.

From the perspective of being more excellent in the effect of the present invention, excellent initial adhesiveness, and low odor, the adduct preferably contains at least one compound selected from the group consisting of Compound 1 represented by Formula (Z1-1) below, Compound 2 represented by Formula (Z1-2), Compound 3 represented by Formula (Z2-1), Compound 4 represented by Formula (Z2-2), and Compound 5 represented by Formula (Z3-1).

[Chemical Formula 15]

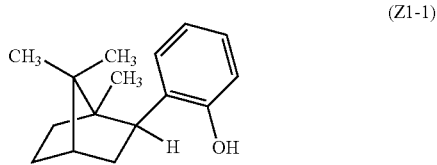

(Z1-1)

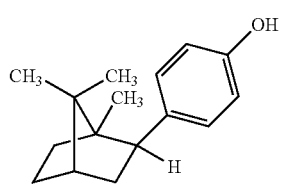

(Z1-2)

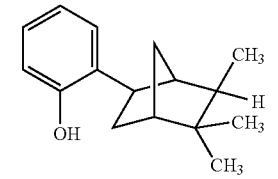

(Z2-1)

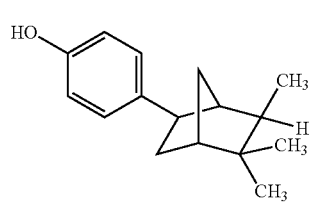

(Z2-2)

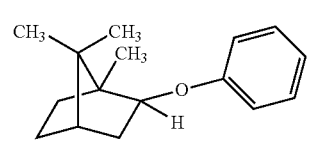

(Z3-1)

Production Method

A method of producing the terpene compound is not particularly limited. When the terpene compound is the adduct described above, examples of a method of producing the adduct include a method of reacting the compound represented by Formula (X) above with the phenol compound.

In the reaction, a used amount of the compound represented by Formula (X) above and a used amount of the phenol compound are not particularly limited.

When reacting the compound represented by Formula (X) above with the phenol compound, the used amount of the compound represented by Formula (X) above and the used amount of the phenol compound (molar ratio of the compound represented by Formula (X): phenol compound) can be, for example, from 1:0.5 to 2, from 1:0.8 to 1.2 is preferable, and 1:1 is more preferable.

The compound represented by Formula (X) above and the phenol compound can be reacted in the presence of a catalyst. Examples of the catalyst include boron trifluoride ether complexes.

The compound represented by Formula (X) above and the phenol compound may be reacted in a solvent. Examples of the solvent include aromatic hydrocarbons such as benzene and toluene; aliphatic hydrocarbons such as cyclohexane; and halogenated hydrocarbons such as carbon tetrachloride.

A reaction temperature when reacting the compound represented by Formula (X) above with the phenol compound can be, for example, from 0 to 100° C.

The terpene compound may be used alone, or a combination of two or more types of the terpene compounds may be used.

When the terpene compound is used in combination, from the perspective of achieving more excellent adhesion durability, excellent initial adhesiveness, and low odor, a combination of the adduct and the monocyclic monoterpene (except for the adduct described above; hereinafter the same) having a hydroxy group is preferable, and a combination of the adduct and terpineol is more preferable.

When the adduct and the monocyclic monoterpene having a hydroxy group are used in combination to form a two-part type adhesive composition, for example, the monocyclic monoterpene having a hydroxy group can be blended into a curing agent using the adduct as a main agent.

From the perspective of achieving more excellent adhesion durability and excellent initial adhesiveness, a content of the terpene compound is preferably from 0.1 to 10 parts by mass, more preferably from 0.1 to 3.0 parts by mass, and even more preferably from 0.5 to 2.0 parts by mass, with respect to 100 parts by mass of the urethane prepolymer.

When the terpene compound uses the adduct and a terpene compound other than the adduct in combination, a mass ratio (adduct/terpene compound other than adduct) of the adduct and the terpene compound other than the adduct is preferably from 0.5 to 1.5 and more preferably from 0.8 to 1.2 from the perspective of achieving more excellent adhesion durability and excellent initial adhesiveness.

(Mass Ratio of Isocyanurate Compound/Adduct)

When the terpene compound is the adduct, a mass ratio (mass ratio of isocyanurate compound/adduct) of the content of the isocyanurate compound to the content of the adduct is preferably from 0.1 to 50, more preferably from 2 to 15, and even more preferably from 2 to 10 from the perspective of being more excellent in the effect of the present invention and achieving excellent initial adhesiveness.

Isocyanate Silane Compound

The adhesive composition according to an embodiment of the present invention preferably further contains an isocyanate silane compound, from the perspective of achieving more excellent adhesion durability and excellent initial adhesiveness.

The isocyanate silane compound that may be further contained in the adhesive composition according to an embodiment of the present invention is a compound having an isocyanate group and a hydrolyzable silyl group.

The isocyanate silane compound may be reacted with each of the urethane prepolymer and the specific isocyanurate compound.

Furthermore, the isocyanate silane compound may be reacted with a polyol compound described below.

Isocyanate Group

The isocyanate silane compound preferably has one isocyanate group per molecule.

Hydrolyzable Silyl Group

The hydrolyzable silyl group in the isocyanate silane compound is similar to the hydrolyzable silyl group in the specific aminosilane compound.

Linking Group

The isocyanate group and the hydrolyzable silyl group can be bonded through a linking group. An example of a preferable aspect is one in which the linking group is divalent.

Examples of the linking group include a hydrocarbon group. Examples of the hydrocarbon group include aliphatic hydrocarbon groups (which may be linear, branched, alicyclic, or combinations of these; hereinafter the same), aromatic hydrocarbon groups, and combinations of these.

Among those, from the perspective of achieving more excellent adhesion durability and excellent initial adhesiveness, the linking group is preferably an aliphatic hydrocarbon group, and more preferably a linear or branched aliphatic hydrocarbon group.

Among these, from the perspective of achieving more excellent adhesion durability, the linking group is preferably a trimethylene group or propylene group, and more preferably a trimethylene group.

From the perspective of achieving more excellent adhesion durability and excellent initial adhesiveness, the number of carbon atoms of the linking group (particularly aliphatic hydrocarbon group) is preferably from 1 to 6, and more preferably from 2 to 3.

The linking group is preferably formed only from carbon and hydrogen.

Formula (I)

From the perspective of achieving more excellent adhesion durability and excellent initial adhesiveness, the isocyanate silane compound is preferably a compound represented by Formula (I) below.

[Chemical Formula 16]

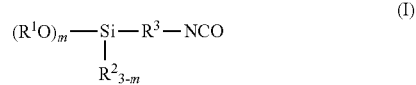

$R^1, R^2$

In Formula (A), $R^1$ and $R^2$ each independently represent a monovalent hydrocarbon group. The monovalent hydrocarbon group as $R^1$ and $R^2$ is similar to the monovalent hydrocarbon group as $R^{10}$ or $R^{20}$ described above.

$R^3$ $R^3$ represents a divalent linking group. The linking group as $R^3$ is similar to the linking group between the isocyanate group and the hydrolyzable silyl group.

It is preferable that $R^3$ represents a divalent hydrocarbon group having from 1 to 6 carbon atoms, a trimethylene group and a propylene group are preferable, and a trimethylene group is more preferable.

m m is from 1 to 3, preferably from 2 to 3, and more preferably 3.

Specific examples of the isocyanate silane compound include 3-isocyanatopropyltrimethoxysilane, 3-isocyanatopropyldimethoxysilane, 3-isocyanatopropyltriethoxysilane, and 3-isocyanatopropyldiethoxysilane.

From the perspective of achieving more excellent adhesion durability and excellent initial adhesiveness, the isocyanate silane compound is preferably 3-isocyanatopropyltrimethoxysilane or 3-isocyanatopropyldimethoxysilane, and more preferably 3-isocyanatopropyltrimethoxysilane.

Content of Isocyanate Silane Compound

A content of the isocyanate silane compound is preferably from 0.01 to 5% by mass, and more preferably from 0.05 to 1% by mass, relative to the total amount of the adhesive composition according to an embodiment of the present invention, from the perspective of achieving more excellent adhesion durability and excellent initial adhesiveness.

The adhesive composition according to an embodiment of the present invention may be formed into a one-part type composition or a two-part type composition.

Two-Part Type Adhesive Composition

When the adhesive composition according to an embodiment of the present invention is a two-part type composition, the two-part type adhesive composition can have a main agent and a curing agent (curing agent in a broad sense).

Main Agent

An example of a preferable aspect is one in which the main agent includes the urethane prepolymer, the specific isocyanurate compound, and the specific aminosilane compound.

The isocyanate silane compound described above can be added to the main agent.

The terpene compound described above can be added to either or both of the main agent and the curing agent described above.

Curing Agent

The curing agent (in a broad sense) described above can contain a compound (curing agent in a narrow sense) having a plurality of active hydrogen-containing groups per molecule. The curing agent in a narrow sense means a compound that substantially reacts with the urethane prepolymer to cure the adhesive composition. The curing agent in the broad sense may include at least the curing agent in a narrow sense.

Examples of the curing agent in a narrow sense include those similar to the active hydrogen compound that can be used in production of the urethane prepolymer.

The curing agent in a narrow sense is preferably polyether polyol or polybutadiene polyol.

The polyether polyol is the same as the polyether polyol described above.

Polybutadiene polyol is a polymer which has two or more hydroxy groups and in which the main chain is a copolymer of polybutadiene or butadiene.

Examples of the main chain of the polybutadiene polyol include butadiene homopolymer and a copolymer of butadiene and other monomer components. Examples of monomer components that can be copolymerized with butadiene include styrene and acrylonitrile. The monomer component can be used alone or in combination of two or more kinds.

The polybutadiene polyol may be hydrogenated.

The number of hydroxy groups that can be contained in polybutadiene polyol per molecule can be two or more. The number of hydroxy groups that can be contained in polybutadiene polyol per molecule may be an average value.

In the polybutadiene polyol, a position at which the hydroxy group is bonded is not particularly limited, and the hydroxy group is preferably bonded to a terminal.

An example of a preferable aspect is one in which the polybutadiene polyol is liquid at room temperature.

Commercially available products such as R45HT and R15HT (both available from Idemitsu Kosan Co., Ltd.) can be used as the polybutadiene polyol.

In the case of the two-part type, for example, a urethane prepolymer can be used in an amount such that an amount of isocyanate group per 1 mol of an active hydrogen-containing group (for example, hydroxy group) in the curing agent in a narrow sense is, for example, from 1.5 to 2.5 mol.

Other Optional Components

The adhesive composition according to an embodiment of the present invention can further contain, as required, various additives such as a filler (for example, carbon black and calcium carbonate), a curing catalyst, a plasticizer, an anti-aging agent, an antioxidant, a silane coupling agent other than the specific aminosilane compound and the isocyanate silane compound, a pigment (dye), a thixotropic agent, a UV absorber, a flame retardant, a surfactant (including a leveling agent), a dispersant, a dehydrating agent, an adhesion promoter other than the terpene compound, and an antistatic agent, in the range where the additives do not impair the object of the present invention.

Note that, for example, the filler may be subjected to surface treatment by at least one treatment agent selected from the group consisting of fatty acid, resin acid, a urethane compound, and fatty acid ester.

When the adhesive composition according to an embodiment of the present invention is the two-part type composition, whether the optional components are added to the main agent or the curing agent can be selected appropriately.

Carbon Black

The adhesive composition according to an embodiment of the present invention preferably further contains carbon black.

The carbon black is not particularly limited. Examples of the carbon black include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), and Medium Thermal (MT).

Specifically, SEAST 9 (available from Tokai Carbon Co., Ltd.) as the SAF, Showa Black N 220 (available from Showa Cabot K.K.) as the ISAF, SEAST 3 (available from Tokai Carbon Co., Ltd.) and Niteron #200 (available from NSCC Carbon Co., Ltd.) as the HAF, and HTC #100 (available from Chubu Carbon K.K.) as the FEF are exemplified. Additionally, Asahi #55 (available from Asahi Carbon Co., Ltd.) and SEAST 5 (available from Tokai Carbon Co., Ltd.) as the GPF, Asahi #50 (available from Asahi Carbon Co., Ltd.) and Mitsubishi #5 (available from Mitsubishi Chemical Corporation) as the SRF, Asahi Thermal (available from Asahi Carbon Co., Ltd.) and HTC #20 (available from Chubu Carbon K.K.) as the FT, Asahi #15 (available from Asahi Carbon Co., Ltd.) as the MT, and the like are exemplified.

The content of the carbon black is preferably from 30 to 70 parts by mass, and more preferably from 40 to 60 parts by mass, with respect to 100 parts by mass of the urethane prepolymer.

Calcium Carbonate

The adhesive composition according to an embodiment of the present invention preferably further contains calcium carbonate.

The calcium carbonate is not particularly limited. Examples of the calcium carbonate include heavy calcium carbonate, precipitated calcium carbonate (light calcium carbonate), and colloidal calcium carbonate.

A content of the calcium carbonate is preferably from 20 to 150 parts by mass, more preferably from 20 to 120 parts by mass, and even more preferably from 30 to 70 parts by mass, with respect to 100 parts by mass of the urethane prepolymer or the curing agent in a narrow sense.

Examples of a filler other than carbon black and calcium carbonate include an organic or inorganic filler of any form. Specific examples of the filler include silica such as fumed silica, calcined silica, precipitated silica, pulverized silica, and molten silica; diatomaceous earth; iron oxide, zinc oxide, titanium oxide, barium oxide, magnesium oxide; magnesium carbonate, zinc carbonate; pyrophyllite clay, kaolin clay, calcined clay; and fatty acid-treated products, resin acid-treated products, urethane compound-treated products, and fatty acid ester-treated products of these.

Curing Catalyst

The curing catalyst is not particularly limited, and specific examples of the curing catalyst include carboxylic acids such as 2-ethylhexanoic acid and oleic acid; phosphoric acids such as polyphosphoric acid, ethyl acid phosphate, and butyl acid phosphate; a bismuth catalyst such as bismuth octylate; a tin catalyst such as dibutyltin dilaurate and dioctyltin dilaurate; and a tertiary amine catalyst such as 1,4-diazabicyclo[2.2.2]octane, 2,4,6-tris(dimethylaminomethyl)phenol (for example, DMP-30), and a compound including a dimorpholinodiethyl ether structure.

From the perspective of more excellent predetermined adhesiveness, the curing catalyst preferably includes a dimorpholinodiethyl ether structure.

The dimorpholinodiethyl ether structure is a structure including dimorpholinodiethyl ether as a basic backbone.

In the dimorpholinodiethyl ether structure, a hydrogen atom in a morpholine ring may be substituted with a substituent. The substituent is not particularly limited. Examples of the substituent include an alkyl group. Examples of the alkyl group include a methyl group and an ethyl group.

Examples of the amine catalyst including the dimorpholinodiethyl ether structure include a compound represented by Formula (9) below.

[Chemical Formula 17]

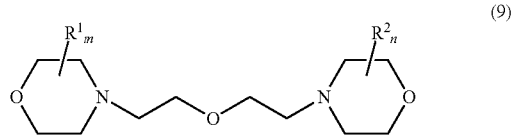

(9)

In Formula (9) above, $R^1$ and $R^2$ are each independently an alkyl group, and m and n are each independently 0, 1, or 2.

Specific examples of the amine catalyst including the dimorpholinodiethyl ether structure include dimorpholinodiethyl ether (DMDEE), di(methylmorpholino)diethyl ether, and di(dimethylmorpholino)diethyl ether.

The curing catalyst can be used alone or in combination of two or more types thereof.

A content of the curing catalyst is preferably from 0.05 to 2.0 parts by mass and more preferably from 0.1 to 0.5 parts by mass, with respect to 100 parts by mass of the urethane prepolymer or the curing agent in a narrow sense.

Plasticizer

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer is preferably from 1 to 50 parts by mass, and more preferably from 5 to 40 parts by mass, with respect to 100 parts by mass of the urethane prepolymer.

Production Method

When the adhesive composition according to an embodiment of the present invention is a one-part type composition, the production method thereof is not particularly limited, and the adhesive composition can be produced, for example, by a method of mixing the urethane prepolymer, the specific isocyanurate compound, the specific aminosilane compound, and other optional components that can be used as necessary.

When the adhesive composition according to an embodiment of the present invention is a two-part type composition, the production method thereof is not particularly limited, and the adhesive composition can be produced, for example, by a method in which the main agent and the curing agent are charged in separate containers, and are mixed in a nitrogen gas atmosphere in the respective containers.

As a method of use of the two-part type, the main agent and the curing agent may be used by mixing them.

Base Material

Examples of the base material to which the adhesive composition according to an embodiment of the present invention can be applied include plastics, glass, rubbers, metals, and the like.

Suitable examples of the base material include a base material including an olefin resin.

The base material including an olefin resin may be a base material obtained from a mixture of the olefin resin and a filler such as carbon fibers, glass such as glass fillers, talc, calcium carbonate or alumina.

The plastic may be, for example, a homopolymer, a copolymer, or a hydrogenated product. The same applies to rubber.

Specific examples of the plastic include olefin resins, such as polypropylene, polyethylene, ethylene propylene copolymers, cycloolefin polymers (COP), and cycloolefin copolymers (COC);

polyester resins, such as polyethylene terephthalate (PET) and polybutylene terephthalate (PBT);

polymethyl methacrylate resins (PMMA resins); polycarbonate resins; polystyrene resins; acrylonitrile-styrene copolymer resins; polyvinyl chloride resins; acetate resins; ABS resins (acrylonitrile-butadiene-styrene resins); and polyamide resins.

"COC" means a cycloolefin copolymer such as a copolymer of tetracyclododecene and olefin such as ethylene.

Additionally, "COP" means a cycloolefin polymer such as a polymer obtained by, for example, subjecting norbornenes to ring-opening polymerization and hydrogenation.

The plastic may be a poorly adhesive resin.

The base material may be subjected to surface treatment. Examples of the surface treatment include flame treatment, corona treatment, and ITRO treatment. A method of the surface treatment is not particularly limited. Examples of the method include a known method.

The method of applying the adhesive composition according to an embodiment of the present invention to the base material is not particularly limited. Examples of the method include a known method.

When the adhesive composition according to an embodiment of the present invention is used, the adhesion durability can be exhibited at an excellent level without using a primer to the base material. The adhesive composition according to an embodiment of the present invention exhibits excellent initial adhesiveness (without using a primer to the base material).

The adhesive composition according to an embodiment of the present invention can be cured by moisture or the like. For example, the adhesive composition according to an embodiment of the present invention can be cured in the condition of from 5 to 90° C. at a relative humidity (RH) of from 5 to 95%.

Application

Examples of the use of the adhesive composition according to an embodiment of the present invention include direct glazing adhesives, sealants for automobiles, and sealants for building components.

EXAMPLES

An embodiment of the present invention will be described below in detail by way of examples. However, an embodiment of the present invention is not limited to such examples.

Production of One-Part Type Adhesive Composition

Components in the column of "Main agent of one-part type adhesion composition or two-part type adhesive composition" of Table 1 below were mixed by using an agitator according to composition (parts by mass) shown in the same table. The resulting mixture was used as a one-part adhesive composition.

Production of Two-Part Type Adhesive Composition

Each main agent and each curing agent were produced by mixing components of Table 1 below according to composition (parts by mass) shown in the same table by using an agitator to obtain a two-part type adhesive composition.

Next, 100 g of the main agent produced as described above and the curing agent produced as described above were mixed at a mass ratio shown in the column of "Main agent/curing agent of two-part type" shown in Table 1, and a mixture of a two-part type adhesive composition was obtained.

Preparation of Test Sample

Initial Test Sample

A test sample was formed using a composition containing polypropylene resin and glass fibers (GF) (trade name: Funcster, available from Japan Polypropylene Corporation; described as "PP-GF" in Table 1), and two base materials (width: 25 mm, length: 120 mm, thickness: 3 mm) in which flame treatment was applied to one surface were prepared. After the flame treatment, it was confirmed that the wettability on the surface of the resin was 45.0 mN/m or greater, using the Wetting Tension Test Mixture (available from Wako Pure Chemical Industries, Ltd.).

Then, a mixture of the one-part type adhesion composition or the two-part type adhesion composition was applied onto the frame-treated surface of one of the base materials in a manner that the width was 25 mm, the length was 10 mm, and the thickness was 5 mm, and then the coated surface was adhered to the frame-treated surface of the other base material, compression-bonded, and left for three days under conditions at 23° C. and 50% RH, to prepare an initial test sample.

Test Sample after Water Immersion Aging

Water Immersion Aging Test

A water immersion aging test was performed in which each initial test sample was immersed for 2,000 hours in warm water at 50° C. to obtain a test sample after water immersion aging.

Test Sample after Heat Aging

A heat aging test was performed in which each initial test sample was left for 2,000 hours at 90° C. to obtain a test sample after heat aging.

Evaluation

For each test sample produced as described above, the adhesiveness was evaluated by the methods described below. The results are shown in Table 1.

Tensile Test

For each test sample prepared as described above, a tensile test (pulling speed of 50 mm/min at 20° C.) was performed in accordance with JIS K6850:1999 to measure shear strength (MPa) of each test sample, and a failure state of each test sample was visually observed.

After the tensile test, for the failure state of the initial test sample, the test sample after water immersion aging, or the test sample after heat aging, the test sample in which cohesive failure was observed in the adhesive was evaluated as "CF", and the test sample in which interfacial peeling was observed between an adherend and the adhesive was evaluated as "AF". "CF/AF" represents coexistence of cohesive failure and interfacial peeling.

Evaluation Criteria for Adhesion Durability

In the present invention, a case where the failure state after water immersion aging and heat aging was "CF" was evaluated as "most excellent adhesion durability".

A case where either one of the failure states after water immersion aging and heat aging was "CF" and the remainder was "CF/AF" was evaluated as "very excellent adhesion durability".

A case where the failure state after water immersion aging and heat aging was "CF/AF" was evaluated as "slightly excellent adhesion durability".

A case where either one of the failure states after water immersion aging and heat aging was "CF/AF" and the remainder was "AF" was evaluated as "slightly poor adhesion durability".

A case where both the failure state after water immersion aging and the failure state after heat aging were "AF" was evaluated as "very poor adhesion durability".

In the present invention, when the evaluation was "most excellent adhesion durability", "very excellent adhesion durability", or "slightly excellent adhesion durability", the adhesion durability was evaluated as excellent.

Evaluation Criteria for Shear Strength

When the evaluation result of the failure state of the test sample after water immersion aging is equivalent, of the test samples, the one with higher shear strength is preferable. The same applies to the test sample after heat aging.

The shear strength after water immersion aging is preferably 3.0 MPa or more. The same applies to the shear strength after heat aging.

Evaluation Criteria for Initial Test Sample

"Excellent Initial Adhesiveness"

In the present invention, a case where the failure state of the initial test sample after the tensile test was "CF" and initial shear strength was 3.0 MPa or more was evaluated as "excellent initial adhesiveness".

"Slightly Poor Initial Adhesiveness"

A case where the failure state was "CF" and the initial shear strength was less than 3.0 MPa or a case where the failure state was "CF/AF" and the initial shear strength was 3.0 MPa or more was evaluated as "slightly poor initial adhesiveness".

"Very Poor Initial Adhesiveness"

A case where the failure state was "CF/AF" and the initial shear strength was less than 3.0 MPa or a case where the failure state was "AF" was evaluated as "very poor initial adhesiveness".

Evaluation Criteria for Shear Strength of Initial Test Sample

When the evaluation result of the failure state of the initial test sample is equivalent, of the test samples, the one with higher shear strength is evaluated to have more excellent initial adhesiveness.

TABLE 1-1

| | | | Comparative Example 1 | Comparative Example 2 | Comparative Example 3 | Comparative Example 4 | Comparative Example 5 |
|---|---|---|---|---|---|---|---|
| Main agent of one-part type adhesive composition or two-part type adhesive composition | Urethane prepolymer | | 42.0 | 42.0 | 42.0 | 42.0 | 42.0 |
| | Isocyanurate compound 1 (PDI) | | | 2.00 | | | 2.00 |
| | Isocyanurate compound 2 (HDI) | | | | | | |
| | Secondary aminosilane compound 1 (bis type) | | | | 0.2 | | |
| | Secondary aminosilane compound 2 | | | | | | |
| | (Comparison) Primary aminosilane compound | | | | | | 0.2 |
| | (Comparison) Tertiary aminosilane compound | | | | | | |
| | (Comparison) Mercaptosilane | | | | | | |
| | (Comparison) Sulfide silane | | | | | | |
| | Terpene compound 1 | | | | | | |
| | Isocyanate silane compound | | | | | | |
| | Carbon black | | 20.6 | 20.6 | 20.6 | 20.6 | 20.6 |
| | Calcium carbonate 1 | | 19.3 | 19.3 | 19.3 | 19.3 | 19.3 |
| | Plasticizer 1 | | 15.5 | 15.5 | 15.5 | 15.5 | 15.5 |
| | Curing catalyst 1 | | 0.15 | 0.15 | 0.15 | 0.15 | 0.15 |
| | Total | | 97.55 | 99.55 | 97.75 | 97.55 | 99.75 |
| Curing agent of two-part type adhesive composition | Polyol compound 1 | | | | | 45.9 | |
| | Polyol compound 2 | | | | | 5.0 | |
| | Terpene compound 2 | | | | | 2 | |
| | Calcium carbonate 2 | | | | | 46.8 | |
| | Curing catalyst 2 | | | | | 0.3 | |
| | Total | | 0.0 | 0.0 | 0.0 | 100.0 | 0.0 |
| Main agent/curing agent (mass ratio) of two-part type | | | — | — | — | 10/1 | — |
| Shear test result: PP-GF* PP-GF* | Initial | Failure state | AF | CF/AF | CF | AF | CF |
| | | Strength [MPa] | 0.28 | 1.52 | 3.82 | 0.25 | 3.22 |
| | After water immersion aging | Failure state | AF | AF | CF/AF | AF | AF |
| | | Strength [MPa] | 0.49 | 0.25 | 2.44 | 0.31 | 0.44 |
| | After heat aging | Failure state | AF | AF | AF | AF | AF |
| | | Strength [MPa] | 0.52 | 0.98 | 1.37 | 0.35 | 0.18 |

TABLE 1-2

|  |  | Comparative Example 6 | Comparative Example 7 | Comparative Example 8 | Example 1 | Example 2 |
|---|---|---|---|---|---|---|
| Main agent of one-part type adhesive composition or two-part type adhesive composition | Urethane prepolymer | 42.0 | 42.0 | 42.0 | 42.0 | 42.0 |
| | Isocyanurate compound 1 (PDI) | 2.00 | 2.00 | 2.00 | 2.0 | 2.0 |
| | Isocyanurate compound 2 (HDI) | | | | | |
| | Secondary aminosilane compound 1 (bis type) | | | | 0.2 | 0.2 |
| | Secondary aminosilane compound 2 | | | | | |
| | (Comparison) Primary aminosilane compound | | | | | |
| | (Comparison) Tertiary aminosilane compound | 0.2 | | | | |
| | (Comparison) Mercaptosilane | | 0.2 | | | |
| | (Comparison) Sulfide silane | | | 0.2 | | |
| | Terpene compound 1 | | | | | 0.5 |
| | Isocyanate silane compound | | | | | |
| | Carbon black | 20.6 | 20.6 | 20.6 | 20.6 | 20.6 |
| | Calcium carbonate 1 | 19.3 | 19.3 | 19.3 | 19.3 | 19.3 |
| | Plasticizer 1 | 15.5 | 15.5 | 15.5 | 15.5 | 15.5 |
| | Curing catalyst 1 | 0.15 | 0.15 | 0.15 | 0.15 | 0.15 |
| | Total | 99.75 | 99.75 | 99.75 | 99.75 | 100.25 |
| Curing agent of two-part type adhesive composition | Polyol compound 1 | | | | | |
| | Polyol compound 2 | | | | | |
| | Terpene compound 2 | | | | | |
| | Calcium carbonate 2 | | | | | |
| | Curing catalyst 2 | | | | | |
| | Total | 0.0 | 0.0 | 0.0 | 0.0 | 0.0 |
| Main agent/curing agent (mass ratio) of two-part type | | — | — | — | — | — |
| Shear test result: PP-GF*/PP-GF* | Initial | Failure state | CF | CF | CF | CF | CF |
| | | Strength [MPa] | 3.08 | 3.02 | 3.66 | 4.21 | 4.56 |
| | After water immersion aging | Failure state | AF | CF/AF | CF/AF | CF/AF | CF |
| | | Strength [MPa] | 0.51 | 1.84 | 2.56 | 3.58 | 4.33 |
| | After heat aging | Failure state | AF | AF | AF | CF/AF | CF/AF |
| | | Strength [MPa] | 0.28 | 0.89 | 1.35 | 3.44 | 3.27 |

TABLE 1-3

|  |  | Example 3 | Example 4 | Example 5 | Example 6 | Example 7 | Example 8 |
|---|---|---|---|---|---|---|---|
| Main agent of one-part type adhesive composition or two-part type adhesive composition | Urethane prepolymer | 42.0 | 42.0 | 42.0 | 42.0 | 42.0 | 42.0 |
| | Isocyanurate compound 1 (PDI) | 2.0 | 2.0 | | | 2.0 | 2.0 |
| | Isocyanurate compound 2 (HDI) | | | 2.0 | 2.0 | | |
| | Secondary aminosilane compound 1 (bis type) | 0.2 | 0.2 | 0.2 | 0.2 | | |
| | Secondary aminosilane compound 2 | | | | | 0.2 | 0.2 |
| | (Comparison) Primary aminosilane compound | | | | | | |
| | (Comparison) Tertiary aminosilane compound | | | | | | |
| | (Comparison) Mercaptosilane | | | | | | |
| | (Comparison) Sulfide silane | | | | | | |
| | Terpene compound 1 | 0.5 | 0.5 | 0.5 | 0.5 | 0.5 | 0.5 |
| | Isocyanate silane compound | 0.3 | 0.3 | 0.3 | 0.3 | 0.3 | 0.3 |

TABLE 1-3-continued

|  |  |  | Example 3 | Example 4 | Example 5 | Example 6 | Example 7 | Example 8 |
|---|---|---|---|---|---|---|---|---|
|  | Carbon black |  | 20.6 | 20.6 | 20.6 | 20.6 | 20.6 | 20.6 |
|  | Calcium carbonate 1 |  | 19.3 | 19.3 | 19.3 | 19.3 | 19.3 | 19.3 |
|  | Plasticizer 1 |  | 15.5 | 15.5 | 15.5 | 15.5 | 15.5 | 15.5 |
|  | Curing catalyst 1 |  | 0.15 | 0.15 | 0.15 | 0.15 | 0.15 | 0.15 |
|  | Total |  | 100.55 | 100.55 | 100.55 | 100.55 | 100.55 | 100.55 |
| Curing agent of two-part type adhesive composition | Polyol compound 1 |  |  | 45.9 |  | 45.9 |  | 45.9 |
|  | Polyol compound 2 |  |  | 5.0 |  | 5.0 |  | 5.0 |
|  | Terpene compound 2 |  |  | 2 |  | 2 |  | 2 |
|  | Calcium carbonate 2 |  |  | 46.8 |  | 46.8 |  | 46.8 |
|  | Curing catalyst 2 |  |  | 0.3 |  | 0.3 |  | 0.3 |
|  | Total |  | 0.0 | 100.0 | 0.0 | 100.0 | 0.0 | 100.0 |
| Main agent/curing agent (mass ratio) of two-part type |  |  | — | 10/1 | — | 10/1 | — | 10/1 |
| Shear test result: PP-GF* PP-GF* | Initial | Failure state | CF | CF | CF | CF | CF | CF |
|  |  | Strength [MPa] | 4.67 | 3.92 | 4.15 | 4.01 | 4.25 | 3.89 |
|  | After water immersion aging | Failure state | CF | CF | CF | CF | CF | CF |
|  |  | Strength [MPa] | 4.98 | 4.32 | 4.03 | 3.88 | 4.11 | 3.76 |
|  | After heat aging | Failure state | CF | CF | CF/AF | CF/AF | CF/AF | CF/AF |
|  |  | Strength [MPa] | 4.46 | 4.01 | 3.65 | 3.30 | 3.78 | 3.51 |

Water immersion aging: 50° C. water immersion × 2000 hours
Heat aging: 90° C. × 2000 hours
*Base material: Funcster (available from Japan Polypropylene Corporation)

The details of each component shown in each table are as follows. Main agent of one-part type adhesive composition or two-part type adhesive composition Urethane prepolymer: urethane prepolymer produced by mixing 70 parts by mass of polyoxypropylene diol (trade name: SANNIX PP2000, available from Sanyo Chemical Industries, Ltd.; weight average molecular weight: 2,000), polyoxypropylene triol (trade name: SANNIX GP3000, available from Sanyo Chemical Industries, Ltd.; weight average molecular weight: 3,000), and MDI (trade name: Sumidur 44S, available from Sumika Bayer Urethane Co., Ltd.) in a manner that NCO/OH (molar ratio) was 2.0, and reacting the mixture in a condition at 80° C. for 5 hours.

Isocyanurate compound 1 (PDI): isocyanurate body of pentamethylene diisocyanate represented by Formula (C1-2) above (available from Mitsui Chemicals, Inc.). Molecular weight 462

Isocyanurate compound 2 (HDI): isocyanurate body of hexamethylene diisocyanate represented by Formula (C1-1) above (available from Mitsui Chemicals, Inc.). Molecular weight 504

Secondary aminosilane compound 1 (bis type): compound represented by the following formula: N, N-[3-(trimethoxysilyl)propyl]amine. Trade name: Silquest A-1170 silane, available from Momentive. Molecular weight 341.5

[Chemical Formula 18]

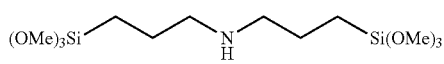

Secondary aminosilane compound 2: N-phenyl-3-aminopropyltrimethoxysilane. Silquest Y-9669. Available from Momentive. Molecular weight 255

(Comparison) Primary aminosilane compound: 3-aminopropyltrimethoxysilane. Available from Shin-Etsu Chemical Co., Ltd.

(Comparison) Tertiary aminosilane compound: N, N-dimethyl-3-(trimethoxysilyl)propylamine. Available from Tokyo Chemical Industry Co., Ltd.

(Comparison) Mercaptosilane: 3-mercaptopropyltrimethoxysilane. Available from Momentive.

(Comparison) Sulfide silane: compound represented by Formula (2) below.

[Chemical Formula 19]

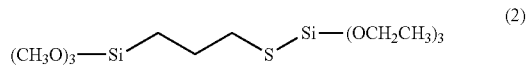

Terpene compound 1: adduct of camphene and phenol. The adduct contains at least one compound selected from the group consisting of Compound 1 represented by Formula (Z1-1) below, Compound 2 represented by Formula (Z1-2), Compound 3 represented by Formula (Z2-1), Compound 4 represented by Formula (Z2-2), and Compound 5 represented by Formula (Z3-1). Available from Yasuhara Chemical Co., Ltd.

[Chemical Formula 20]

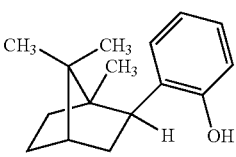

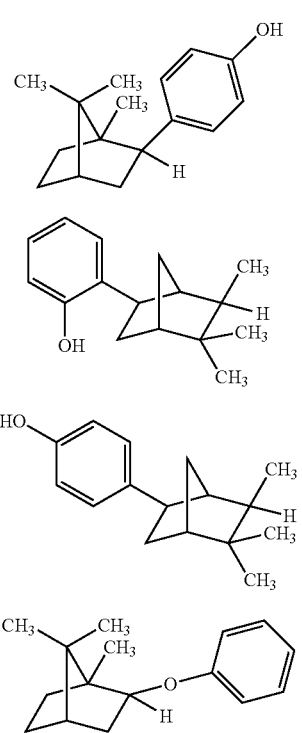

Isocyanate silane compound: 3-isocyanatopropyltrimethoxysilane, available from Momentive Carbon black: trade name: Niteron #200, available from Nippon Steel Chemical Carbon Co. Ltd., HAF-grade carbon black Calcium carbonate 1: Heavy calcium carbonate, trade name: Super S, available from Maruo Calcium Co., Ltd.

Plasticizer 1: diisononyl phthalate, available from J-Plus Co., Ltd.

Curing catalyst 1: dimorpholinodiethyl ether, trade name: UCAT-660M, available from San-Apro Ltd.

Curing Agent of Two-Part Type Adhesive Composition

Polyol compound 1: polyoxypropylene triol, weight average molecular weight 1,000, trade name: EXCENOL 1030, available from Asahi Glass Co., Ltd. The compound corresponds to the curing agent in a narrow sense.

Polyol compound 2: liquid polybutadiene diol having a hydroxyl group at a terminal ("poly bd R-45 HT", available from Idemitsu Kosan Co., Ltd.). The compound corresponds to the curing agent in a narrow sense. The compound is liquid under a room temperature condition. The compound has about two hydroxy groups per molecule.

Terpene compound 2: terpineol (available from Yasuhara Chemical Co., Ltd.)

Calcium carbonate 2: Calcium carbonate subjected to surface treatment with fatty acid, KALFAIN 200, available from Maruo Calcium Co., Ltd.

Curing catalyst 2 DMDEE: Dimorpholinodiethyl ether, trade name: UCAT-660M, available from San-Apro Ltd.

As can be seen from the results shown in Table 1, Comparative Example 1 (one-part type) and Comparative Example 4 (two-part type), which contained no specific isocyanurate compound and no specific aminosilane compound, exhibited very poor adhesion durability.

Comparative Example 2 (one-part type) containing no specific aminosilane compound exhibited very poor adhesion durability.

Comparative Example 3 (one-part type) containing no specific isocyanurate compound exhibited slightly poor adhesion durability.

Comparative Example 5 (one-part type) containing no specific aminosilane compound and instead containing a primary aminosilane compound exhibited very poor adhesion durability.

Comparative Example 6 (one-part type) containing no specific aminosilane compound and instead containing a tertiary aminosilane compound exhibited very poor adhesion durability.

Comparative Example 7 (one-part type) containing no specific aminosilane compound and instead containing a mercaptosilane compound exhibited slightly poor adhesion durability.

Comparative Example 8 (one-part type) containing no specific aminosilane compound and instead containing a sulfide silane compound exhibited slightly poor adhesion durability.

In contrast, the adhesive composition according to an embodiment of the present invention was excellent in adhesion durability to an olefin resin. Furthermore, the adhesive composition according to an embodiment of the present invention was excellent in initial adhesiveness to an olefin resin.

The invention claimed is:

1. A urethane adhesive composition comprising:
   a urethane prepolymer having an isocyanate group;
   an isocyanurate compound of pentamethylene diisocyanate; and,
   a secondary aminosilane compound; wherein
   the urethane adhesive composition is a one-part adhesive composition or a two-part adhesive composition, the two-part adhesive composition comprising the urethane prepolymer, the isocyanurate compound and the secondary aminosilane compound in a main agent, and further comprising a curing agent, and
   the secondary aminosilane compound is a bis-type compound.

2. The urethane adhesive composition according to claim 1, wherein the secondary aminosilane compound is a compound represented by Formula (A),

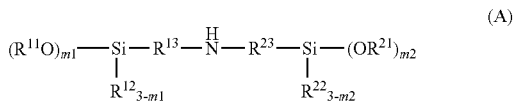

wherein $R^{13}$ and $R^{23}$ each independently represent a divalent linking group, $R^{11}$, $R^{12}$, $R^{21}$, and $R^{22}$ each independently represent a monovalent hydrocarbon group, and m1 and m2 are each independently from 1 to 3.

3. The urethane adhesive composition according to claim 2, wherein $R^{11}$ and $R^{21}$ each independently represent an aliphatic hydrocarbon group in Formula (A).

4. The urethane adhesive composition according to claim 2, wherein $R^{13}$ and $R^{23}$ each independently represent a divalent hydrocarbon group having 2 to 10 carbon atoms in Formula (A).

5. The urethane adhesive composition according to claim 1, further comprising a terpene compound.

6. The urethane adhesive composition according to claim 5, wherein the terpene compound comprises at least an adduct of a compound represented by Formula (X) and a phenol compound,

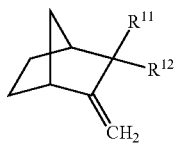

wherein $R^{11}$ and $R^{12}$ each independently represent a hydrocarbon group.

7. The urethane adhesive composition according to claim 1, further comprising an isocyanate silane compound.

8. The urethane adhesive composition according to claim 7, wherein the isocyanate silane compound is a compound represented by Formula (I),

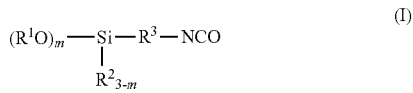

wherein $R^1$ and $R^2$ each independently represent a monovalent hydrocarbon group, $R^3$ represents a divalent linking group, and m is from 1 to 3.

9. The urethane adhesive composition according to claim 8, wherein in Formula (I), $R^3$ represents a divalent hydrocarbon group having 1 to 6 carbon atoms, and m is from 2 to 3.

10. The urethane adhesive composition according to claim 1, wherein a content of the secondary aminosilane compound is from greater than 0% by mass to less than 0.5% by mass relative to a total amount of the urethane adhesive composition.

11. The urethane adhesive composition according to claim 1, used for adhering a base material containing an olefin resin.

12. The urethane adhesive composition according to claim 1, wherein the urethane adhesive composition is the one-part adhesive composition.

\* \* \* \* \*